June 5, 1962 M. J. UDY 3,037,856
FERROMANGANESE PRODUCTION
Filed Oct. 14, 1957
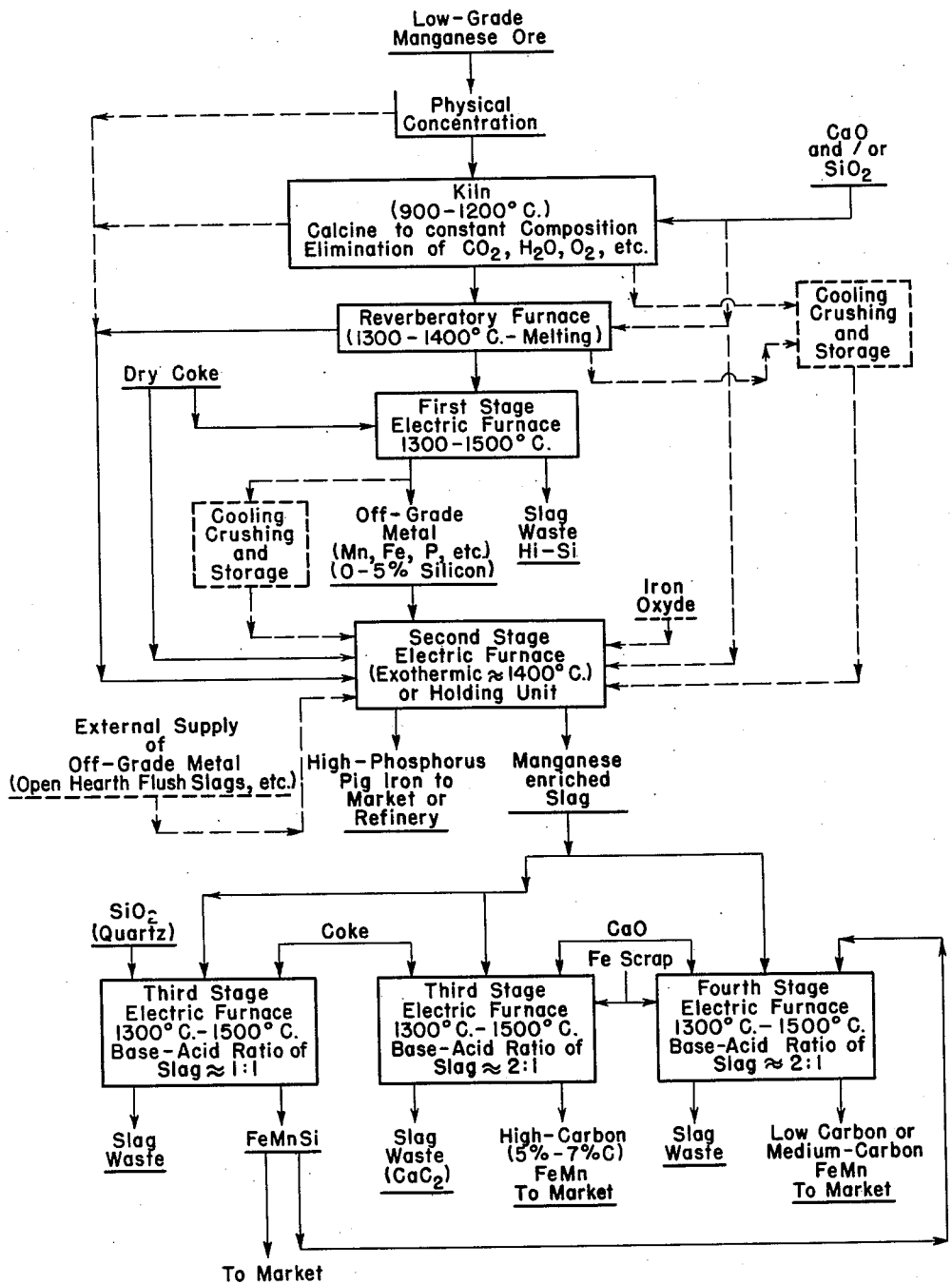
INVENTOR
Marvin J. Udy
BY
Charles J. Elderkin
ATTORNEY

United States Patent Office 3,037,856
Patented June 5, 1962

3,037,856
FERROMANGANESE PRODUCTION
Marvin J. Udy, Niagara Falls, N.Y., assignor, by mesne assignments, to Strategic Materials Corporation, New York, N.Y., a corporation of New York
Filed Oct. 14, 1957, Ser. No. 690,056
1 Claim. (Cl. 75—30)

The present invention relates to metallurgy, in general, and has for a specific object the provision of an improved process for the production of ferromanganese and ferromanganese-bearing alloys such as ferromanganese silicon. More particularly, the invention contemplates the provision of an improved metallurgical process which can be employed advantageously and economically to produce high-grade metallic ferromanganese products from one or more manganese-bearing materials, including ores, concentrates and metals which are generally considered to be substandard or low-grade on the basis of heretofore customary operating techniques for the production of ferromanganese and related alloys.

In my copending United States application Serial No. 523,697, filed July 22, 1955, now Patent No. 2,830,890, granted April 15, 1958, of which this application is a continuation-in-part, I have described and claimed a multi-stage process for the production of standard commercial grade ferromanganese-bearing products from natural or altered charge material of relatively low manganese (oxide) content. In essence, the process of my copending application involves a two-stage selective carbothermic reduction of low-grade manganese-bearing ores or concentrates, as, for example, high-manganese iron ores, in the first stage of which I effect the smelting in an electric furnace under accurate conditions of temperature control, of a pre-treated, substantially constant composition charge of the ore or concentrate with a controlled amount of carbonaceous reducing material, and controlled amounts of added acidic and/or basic fluxing materials, to effect reduction to the metallic state of iron of the charge in excess of that desired in the ferromanganese-bearing product sought to be produced, without reducing to the metallic state any substantial amount of the available manganese content of the original charge, and with the production of molten metallic iron containing any impurities present in the original charge such as phosphorus, arsenic, lead, copper, sulfur, etc., and a molten manganese silicate-bearing slag of controlled base-acid ratio (0.8 to 1.5 base to 1.0 acid) containing the manganese of the charge in oxide form. The metallic iron is then separated from the manganese silicate-bearing slag produced in the first stage and the slag is charged to a second electric furnace in which it is smelted under action of combined arc-resistance, slag-resistance heating in the presence of a controlled amount of a carbonaceous reducing agent, and controlled amounts of added acidic and/or basic fluxing materials to produce a standard grade high-carbon (5–7% C) ferromanganese (80% Mn) product containing manganese of the original charge in amounts representing ninety to ninety-five percent (90–95%) recoveries and higher, and a waste residual slag of controlled base-acid ratio (≈2 base to 1 acid). Alternatively, the second stage smelting of the manganese-bearing slag recovered from the first stage can be conducted to produce a ferromanganese silicon product of controlled silicon content (18–45% Si) and controlled carbon content, containing equivalently high proportions of the overall manganese values available for recovery within the original charge. In the latter instance, the ferromanganese silicon produced in the second stage may be charged to a third furnace with additional quantities of the manganese-beneficiated slag recovered from a first stage smelting operation, and smelted therein under carefully controlled conditions to produce medium-carbon or low-carbon ferromanganese. That is to say, the ferromanganese silicon produced in the second stage may be controlled with respect to silicon-carbon content to provide a product ideally suited for the production of medium-carbon ferromanganese in the third furnace, i.e., a ferromanganese silicon product of approximately eighteen percent (18%) silicon and approximately one and one-half percent (1.5%) carbon, or, it may be adjusted to provide a product of silicon-carbon content ideally suited for the production of low-carbon ferromanganese in the third stage, i.e., a ferromanganese silicon product of approximately forty to forty-five percent (40–45%) silicon and approximately six-hundredths to one-tenth of one percent (0.06 to 0.1%) carbon.

The process of the present invention is based on my discovery that substantial advantages from the standpoint of handling and overall operating efficiencies can be derived through practice of the basic procedural techniques of the process of my aforementioned copending application in conjunction with use of an "off-grade," marginal or sub-standard metallic manganese-bearing product functioning as a combined manganese-beneficiating agent and reductant in the first stage elimination of iron and impurities, such as phosphorus, for the production of the manganese-enriched slag or synthetic high-grade manganese ore which is subsequently utilized in the second and third stages for the production of standard grade ferromanganese products of the general class described. Thus, in accordance with the process of the present invention, a portion of the relatively low-grade manganese-bearing ore undergoing treatment in the process, including, for example, high-manganese, high-phosphorus iron ores or low-grade manganese ores of high-silica content, is subjected to a carbothermic reduction smelting within an electric furnace or equivalent apparatus to produce an "off-grade" metallic product containing all of the iron, manganese and phosphorus, or similar impurities, present within the original ore, but not more than approximately five percent (5.0%) of the silicon of the ore, and a residual waste slag product containing the major portion of silica and gangue materials present within the ore. The resulting metallic product, which I term "off-grade" in the sense that it is of practically no commercial value by reason of the presence therein of high concentrations of impurities such as phosphorus, and because of its relatively low manganese-iron ratio, is thereafter charged to an electric furnace or simple holding apparatus together with additional quantities of the original ore, wherein the manganese, silicon and carbon of the off-grade metal serve to reduce iron and phosphorus out of the ore, thereby producing a molten slag enriched in manganese content through manganese oxidized into the slag from the off-grade metal, only slightly diluted with respect to silica, and, of course, further enriched in manganese by removal of iron and phosphorus from the principal ore charge. The reaction of the off-grade metal with the additional quantities of ore is an exothermic one, and provided the principal ore charge is established in a molten state prior to the addition of the off-grade metal, no external heating is required, and, in fact, the reduction can be effected for large scale operations within a simple ladle or holding furnace. Alternatively, assuming the off-grade metal is cooled and crushed subsequent to its formation, and thereafter utilized in conjunction with a cold or merely sintered or calcined ore charge, the exothermic reaction can be triggered by heating the mixture to approximately 1000° C.

The manganese-enriched slag recovered from the reduction operation effected with the off-grade metal may be processed for the production of any desired ferromanganese product in accordance with the basic principles of my copending application. As will be readily apparent, the resulting furnace burdens will be substantially reduced in volume because of the added enrichment of the manganese oxide-bearing slag and the reduced basic flux requirements resulting from discard of silica in the production of the off-grade metal reductant. The high-phosphorus pig iron recovered from the same stage may be marketed as such, or dephosphorized by standard methods to produce ingot-grade iron.

While I prefer to operate with an off-grade metal produced through use of the same basic ore undergoing treatment within the overall process of the invention, a significant advantage of the process resides in the fact that any external source of off-grade metal can be employed to good advantage. For example, I may employ high-manganese pig iron from any source including off-grade metal produced from open hearth flush slags, metal from blast furnace slags, or virtually any similar manganese-containing material which can be used as a reducing agent to upgrade low-manganese, iron-containing ores or slags. In this connection, it is interesting to note that so long as the silicon content in the off-grade metal is maintained low, theoretically there is no limit to the amount of manganese that can be added to the slag or synthetic manganese-bearing ore by the beneficiation technique of the present invention. From a practical standpoint, however, the limits of addition will be determined by an approach to the corresponding manganese silicates, i.e., $MnSiO_2$ and $2MnSiO_2$. Iron oxide may simply be added, as required, along with the off-grade metal to insure that the entire manganese content available from the off-grade metal will be oxidized into the slag.

It is believed that the aforementioned as well as other features and objects of the invention may be best understood by reference to the following detailed description of specific embodiments thereof taken in conjunction with the accompanying drawing in which the single FIGURE is a schematic flow diagram or flow sheet illustrating the exact sequence of steps involved in a preferred process of my invention, and wherein alternative process measures have been illustrated by means of dotted line showings.

With particular reference to the preliminary portions of the flow sheets of the drawing, it will be seen that the low-grade manganese ore undergoing treatment in the process may be physically concentrated, initially, by any standard technique to separate the massive gangue constituents associated therewith in its natural or mined state. Thereafter, I prefer to calcine the concentrates by heating the same within a rotary kiln or other suitable piece of equipment, prior to the initial reduction step, to a temperature within the range 900–1200° C. in order to stabilize it to a substantially constant composition with respect to oxygen content, etc., and thereby obtain better control of reduction by carbon of coke, coal, etc., employed as the reducing agent in subsequent stages.

In the preparation of a reduction burden for the second smelting operation, as distinguished from the reduction burdens employed in the first stage for the production of the off-grade metallic manganese-bearing beneficiation-reductant, I prefer to include all necessary fluxing materials along with the ore or concentrate charged to the calcining apparatus since this serves further to stabilize the reduction burdens and permits close control over the selective reduction operations thereafter conducted with the material. Of course, the charge can be melted directly within an electric furnace, but I find that the use of a kiln with gas, oil, coal or even waste gases from an electric furnace, provides a more economical and uniform operation as compared with the use of electric energy exclusively.

For the same reason, in actual operation I prefer to melt the calcined concentrates within an oil- or gas-fired furnace of the reverberatory type prior to introduction into the electric furnaces, as also illustrated within the flow diagram, but again, this practice will be controlled largely by the economics of a particular situation and one may bypass the reverberatory furnace and simply charge the calcined concentrates, or even raw ore, directly to the electric furnaces, or the off-grade metal may be produced within a blast furnace. Preferably, further thermal economies can be realized by operating within successive stages of the process of the invention with molten charge material recovered as the end-product from a preceding stage, thereby avoiding the necessity for remelting the various reduction burdens. As a practical storage and handling measure, however, it may sometimes prove necessary to cool intermediate products of the process, and particularly the off-grade metallic manganese-bearing product produced in the initial smelting stage, prior to its utilization in the second stage of smelting. Under these circumstances, one may solidify, cool and crush the off-grade metal to approximately 100 mesh for eventual utilization with molten charge material from the reverberatory furnace, or with previously cooled and crushed slag produced within the reverberatory furnace, or with cold, crushed sinter produced within the calcining stage of the process. In the latter two situations, it is simply necessary to reestablish the admixed off-grade metal and cold slag or sinter at approximately 1000° C. to trigger the exothermic ($\approx 1400°$ C.) reduction mechanism which is normally realized through use of the respective component ingredients in molten form.

In accordance with normal operating procedure, the molten charge produced within the reverberatory furnace is transferred while hot to the first electric furnace, and a carbonaceous reducing agent is added thereto in amount sufficient to effect reduction to the metallic state of substantially all of the manganese, iron and phosphorus contained therein, while avoiding reduction of silicon in excess of approximately five percent (5.0%) by weight within the resulting off-grade metal product. It is desirable to maintain the silicon content within the off-grade metal as low as possible in order to avoid undue silica dilution of the manganese-enriched slag produced in the second stage of smelting.

For maximum efficiency, smelting in the first stage, as well as in succeeding electric furnace stages of the process, is preferably conducted under action of combined arc-resistance, slag-resistance heating and in accordance with the other general furnacing techniques described in my aforementioned copending application. Furthermore, the addition of carbonaceous reducing material to the various reduction burdens within successive stages of the process, is preferably withheld until the reduction burdens are established or re-established, as the case may be, in a fluid, free-flowing, molten state, thereby to promote a rapid rate of reaction while facilitating the settling and separation of reduced metallic values from the overall slag burdens.

The off-grade metal produced in the first stage is separated from its high-silica waste residual slag and charged, preferably while still molten, to the second stage electric furnace together with additional quantities of molten unreduced charge prepared in the reverberatory furnace, and appropriate fluxing materials. In the second stage, the manganese, carbon and silicon contained within the off-grade metal function to reduce iron and phosphorus from the reverberatory slag, while the manganese content of the off-grade metal is oxidized into the slag phase. The resulting products consist of a pig iron metallic phase which functions as a collector for reduced phosphorus and similar impurities, and a manganese-enriched slag phase slightly diluted with silica.

As indicated by the data contained in Table I below, the phosphorus distribution between the metal and slag phases in the second stage may be regulated by adjustment of the base-acid ratio of the slag through the addition of fluxing materials to this stage. These data indicate that the amount of phosphorus left in the slag increased as the furnacing of the same ore in accordance with the technique described hereinbefore.

*Table II*

| Example | Reactants | | | | | | | Products | | | | | |
|---|---|---|---|---|---|---|---|---|---|---|---|---|---|
| | Molten Ore | | | Off-Grade Metal | | | | Up-Graded Slag | | | Pig Iron | | |
| | Mn | Fe | P | Mn | Si | C | P | Mn | Fe | P | Mn | P | C |
| 1 | 12.68 | 22.39 | 0.68 | 50.34 | 5.04 | 4.06 | 3.00 | 32.3 | 5.1 | 0.07 | 2.0 | 2.9 | ------ |
| 2 | 12.68 | 22.39 | 0.68 | 50.34 | 5.04 | 4.06 | 3.00 | 34.1 | 4.9 | 0.09 | 1.6 | 3.3 | ------ |
| 3 | 12.68 | 22.39 | 0.68 | 50.34 | 5.04 | 4.06 | 3.00 | 32.9 | 3.9 | 0.07 | 0.7 | 3.4 | ------ |
| 4 | 12.68 | 22.39 | 0.68 | 50.34 | 5.04 | 4.06 | 3.00 | 33.0 | 3.8 | 0.07 | 0.2 | 3.4 | ------ |
| 5 | 12.68 | 22.39 | 0.68 | 50.34 | 5.04 | 4.06 | 3.00 | 33.0 | 3.1 | 0.07 | 1.0 | 3.0 | ------ |
| 6 | 12.68 | 22.39 | 0.68 | 50.34 | 5.04 | 4.06 | 3.00 | 32.7 | 3.1 | 0.08 | 1.9 | 3.0 | 3.6 |
| 7 | 12.68 | 22.39 | 0.68 | 50.34 | 5.04 | 4.06 | 3.00 | 32.5 | 3.4 | 0.08 | 1.1 | 3.0 | ------ |
| 8 | 12.68 | 22.39 | 0.68 | 50.34 | 5.04 | 4.06 | 3.00 | 32.7 | 2.9 | 0.07 | 1.9 | 2.8 | ------ | base to acid ratio of the slag is varied from approximately 1:1 to 2:1. Of course, the higher the manganese content of the beneficiated slag, the higher can be the residual phosphorus content within the slag. I have found that for optimum results under most conditions of operation, the charge to the second stage should be fluxed such as to provide for the production of molten slag having a base-acid ratio within the range of one mole of base to each mole of acid to one and one-half moles of base to each mole of acid (1:1 to 1.5:1).

*Table I*

| $CaO+1.4MgO+1.18MnO/SiO_2$ | Phos. in Slag | Phos. in Iron |
|---|---|---|
| 1.25 | 0.08 | 3.15 |
| 1.50 | 0.32 | 2.92 |
| 2.0 | 0.55 | 1.85 |

The manganese-enriched slag produced in the second stage is separated from the high-phosphorus pig iron, and may then be processed to produce a variety of different ferro-manganese alloys as illustrated in schematic form on the flow-sheet. The third and fourth stage furnace operations have been described in greater detail within my copending application. It should be noted, however, that by reason of the reduced silica content of the manganese-enriched slags produced in accordance with the process of the present invention, the lime or similar basic flux additions required to establish the indicated optimum base-acid ratios within the third and fourth stages, will be less per pound of manganese than those required when treating beneficiated slags produced in accordance with the process of my copending application.

The following tabulated examples illustrate the specific application of the foregoing principles and objects of the invention to the production of beneficiated manganese slags suitable for use in the production of standard grade ferromanganese alloys. In all instances, the furnace charges consisted of 100 pounds of ore or reverberatory slag and 39 pounds of off-grade metal produced by initial

What is claimed is:

In a process for the production of a synthetic manganese-enriched reduction burden suitable for use in the production of high-grade ferromanganese products from relatively low-grade material containing iron oxide and manganese oxide, and which contains phosphorus as an impurity, involving the selective reduction and removal of iron from the material and the production of an iron-degraded, manganese oxide-enriched slag concentrate, the improvement that comprises subjecting a quantity of the relatively low-grade iron oxide and manganese oxide-bearing material to reduction smelting in the presence of a carbonaceous reducing agent in an amount sufficient to effect selective reduction to the metallic state of all of the iron and manganese of said material along with minor proportions of phosphorus, carbon and silicon and resulting in the production of a low-grade iron-manganese alloy, subjecting an additional quantity of said low-grade iron oxide and manganese oxide-bearing material to reduction smelting in the form of an exothermic reaction mixture with said low-grade iron-manganese alloy to effect the selective reduction to the metallic state of a major portion of the iron oxide content of said material with the production of molten metallic iron and an iron oxide-degraded molten manganese oxide-bearing slag product containing substantially all of the manganese oxide of said material in combination with manganese oxidized into the slag from said low-grade iron-manganese alloy, and controlling the relative phosphorus concentrations within the metallic iron and manganese oxide-bearing slag product by the addition of fluxing material to said reaction mixture in amounts sufficient to provide a base-acid ratio in the manganese oxide-bearing slag within the range of from one to two parts by weight basic components to each part by weight silica contained therein.

References Cited in the file of this patent

UNITED STATES PATENTS 2,687,952  Buehl et al. _____ Aug. 31, 1954